Nov. 29, 1955  M. J. POLISSAR  2,725,278
MANUFACTURE OF URANIUM TETRACHLORIDE
Filed Dec. 13, 1943
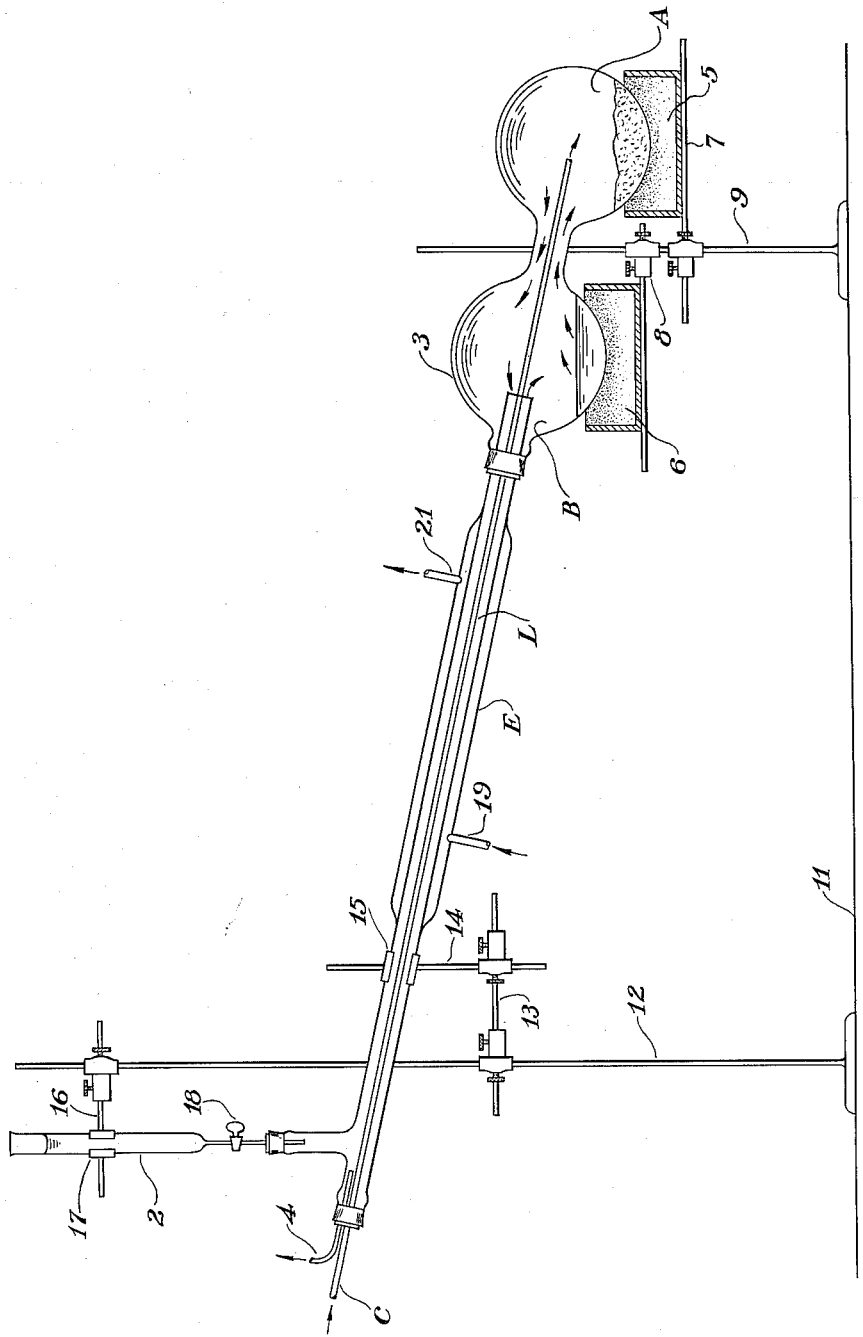
INVENTOR.
MILTON J. POLISSAR
BY
ATTORNEY.

United States Patent Office 2,725,278
Patented Nov. 29, 1955

2,725,278

MANUFACTURE OF URANIUM TETRACHLORIDE

Milton J. Polissar, San Francisco, Calif., assignor to the United States of America as represented by the United States Atomic Energy Commission Application December 13, 1943, Serial No. 514,117

5 Claims. (Cl. 23—14.5)

This invention relates to the manufacture of uranium tetrachloride, especially in high yields of utmost purity. More particularly, it appertains to reacting uranium oxide and carbon tetrachloride while hindering transport of material out of the reaction zone and averting side reactions involving uranium tetrachloride.

Earlier investigators, including Camboulives, Comptes Rendu (1910), 150, 175–177, and Marden, U. S. A. Patent 1,646,734 (1927), October 25, mention the formation of uranium chloride by reacting uranium oxide and carbon tetrachloride.

Treatment of uranium oxide at a temperature between 400° and 500° C. with carbon tetrachloride vapor slightly in excess of stoichiometrical proportions would be a very satisfactory process for preparing uranium tetrachloride if the uranium tetrachloride formed could be precluded from further reaction and the uranium-containing products could be held in the reaction vessel. For example, as disclosed in the copending application of James M. Carter, now Patent No. 2,677,592 issued May 4, 1954, operation in the range of 425° to 475° C. yields a uranium tetrachloride product having a crystalline form and grain size particularly well-suited for use in vacuum apparatus in which it may be vaporized or sublimed in carrying out other processes or methods, in that the product being of relatively large crystalline structure may be readily out-gassed, and has little tendency to be transported as dust in the vacuum apparatus.

Furthermore, such reaction may be conducted in a rotary reactor and particularly in a rotary reactor in which the reaction chamber is lined with nickel or an alloy in which nickel is the chief constituent as disclosed in the copending application of Horace R. McCombie, Serial No. 577,384, filed February 12, 1945, now abandoned. Also, uranium tetrachloride may be produced by the reaction of carbon tetrachloride with an activated form of uranium dioxide as disclosed in the copending application of Myron B. Reynolds et al., Serial No. 19,883, filed April 8, 1948.

When liquid carbon tetrachloride is allowed to drip into the reaction chamber at an elevated temperature there is a high streaming velocity of the vapor past the solid. By "high streaming velocity" is meant a velocity sufficient to carry away from the reaction zone a portion of the finely divided solid material therein. As a result some uranium-containing material is transported away from the reaction mass. Some uranium pentachloride is also formed and it causes clogging of the gas exit lines by depositing therein.

This invention has for an object the complete conversion of uranium dioxide to uranium tetrachloride. Other objects are to perfect apparatus and process for producing pure uranium tetrachloride, to provide apparatus suitable for reacting carbon tetrachloride and uranium oxide without forming uranium pentachloride, to contact carbon tetrachloride vapors moving downwardly by gravity with heated uranium oxide, to sweep slowly gaseous reaction products of carbon tetrachloride and uranium oxide out of the reaction zone while gently flowing carbon tetrachloride vapors counter-current into the reaction zone, and to devise process and apparatus for reacting uranium oxide and carbon tetrachloride in the absence of deleteriously high streaming velocities of gases in the reaction zone. A further object is to produce a gentle movement of carbon tetrachloride vapor over uranium oxide while effectively removing undesirable gaseous products such as carbon oxides. A general advance in the art and other objects which will appear hereinafter are also contemplated.

It has now been found that uranium tetrachloride can be prepared in high yields and of high purity by maintaining a gentle but continuous flow of carbon tetrachloride vapors over uranium dioxide heated at a temperature within the range 425° to 475° C. It has also been found that an apparatus particularly suited to carry out this procedure comprises vaporizing and reaction chambers so connected and arranged that the carbon tetrachloride vapors move by gravity from the vaporizing chamber into the reaction chamber and the gaseous products formed in the reaction chamber are forced to exit through the vaporizing chamber.

How the foregoing objects and related ends are accomplished will be apparent from the following exposition in which are disclosed the principle, the organization and divers embodiments of the invention, including the best mode contemplated for carrying out the same, all of which is amplified by the accompanying drawing in which the preferred apparatus is shown diagrammatically. Parts are given by weight throughout the written description.

Referring now to the single sheet of the drawing, there is shown a reaction vessel 3 connected to a condenser L which is in turn connected to a supply reservoir 2. An inner gas line C extends through the condenser and into the reaction vessel. The reaction vessel is shaped somewhat like an hourglass and comprises a reaction chamber A and a vaporizing chamber B. These chambers are supported on sand bath heaters 5 and 6, respectively. The sand heater 5 is supported on a bracket 7 and the sand heater 6 is supported on a bracket 8. Both brackets are secured to the upright of a stand 9 which rests on the surface 11. At the other end of the apparatus the upright of a stand 12 supports a bracket 13 which in turn supports bracket 14 which in its turn, through a clamp 15, supports the elevated end of the condenser at which end is vent 4. The upright of the stand 12 also supports a bracket 16 to which is secured a clamp 17 which in turn supports the reservoir 2. Usually the reservoir 2 is graduated and has a gravity feed valve 18 whereby the rate at which the liquid reactant is being utilized can be determined. A container for an inert gas under pressure (not shown) is connected at the upper end of the line C. The outer jacket E of the condenser has the usual inlet 19 and outlet 21 for a cooling fluid.

In operation the reaction chamber A is charged with uranium dioxide and the reaction vessel 3 connected to the condenser L. A gentle stream of inert gas such as nitrogen is flowed into the reaction chamber A through the line C to sweep out the air. The flow of inert gas continues throughout the reaction during which time it serves to sweep out by-product gases and excess carbon tetrachloride vapor. Heat is then applied to the reaction chamber A and a flow of carbon tetrachloride started through the valve 18. This carbon tetrachloride collects in the vaporizing vessel B. After a pool of the desired size has collected, heat is applied and the addition of carbon tetrachloride from the reservoir 2 regulated to keep the level substantially constant. Upon the application of heat to the vaporizing chamber B some of the carbon tetrachloride vapors enter the condenser L and are refluxed. Another portion of the vapor flows by gravity into the reaction chamber where it reacts with the uranium dioxide, usually forming carbon monoxide, carbon dioxide, phosgene and chlorine. These gases are swept up into the condenser along with some carbon tetrachloride vapor by means of the nitrogen entering through the line C. Some of the phosgene is dissolved in the carbon tetrachloride and carried back into the reaction chamber where it reacts with the uranium dioxide. The gases which are not condensed in the condenser are vented through the line 4, usually into a scrubber of some sort.

Efforts to drop the carbon tetrachloride directly into the reaction chamber have not been successful since liquid carbon tetrachloride boils to form relatively tremendous volumes of vapor and as a result the velocity of the gas sweeps some of the desired product out of the reaction vessel, thereby lowering the yield. In addition, uranium pentachloride, which is volatile relative to the UCl₄, is formed in such an operation and passes into the condenser, clogging the apparatus.

Example I

Place a charge of 2,242 parts of uranium dioxide in the reaction chamber A of the previously described apparatus. Connect the reaction vessel 3 to condenser as shown in the drawing. Introduce nitrogen in a slow stream through the inner line C to sweep out, first, the air from the apparatus, and then, after the reaction starts, the gaseous reaction products. Apply heat to the bulb containing the solid raw material and start dropping carbon tetrachloride from the measuring container 2 into the condenser L. This liquid will collect in the vaporizing chamber B. Apply heat to the bulb containing the carbon tetrachloride and, when it starts refluxing, maintain that condition. The carbon tetrachloride vapor at its boiling point is very much heavier than nitrogen and the hot gases such as carbon monoxide, carbon dioxide, phosgene and chlorine formed in the course of the reaction. Some of the carbon tetrachloride, therefore, continuously and gently flows downwardly into the reaction chamber. When there is no reaction, the only gas leaving the system is the small amount of nitrogen used to maintain the slight sweeping action. When the reaction mass reaches 450° C., maintain it at that temperature until the reaction is complete. In addition to carbon monoxide and carbon dioxide formed during the reaction, some phosgene (COCl₂) and chlorine are produced. At least a part of the phosgene is absorbed by the carbon tetrachloride and returned for reaction with the uranium oxide. By adjusting the flow of carbon tetrachloride from the reservoir to keep the volume of the pool in the vaporizing chamber B substantially constant the rate of the reaction can be accurately followed. At the completion of the reaction 3,153 parts of uranium tetrachloride will be obtained from the reaction chamber.

Example II

Repeat the procedure of Example I using 1,056 parts of uranium trioxide and maintain at an operating temperature of 500° C. A yield of 1,392 parts of uranium tetrachloride will be obtained. UCl₅ which tends to form due to the use of UO₃ as charge stock is thermally unstable at this reaction temperature, and is substantially converted into UCl₄.

In carrying out the present process employing uranium dioxide in the production of uranium tetrachloride, the reaction temperature should be maintained as near 450° C. as practicable. However, good results are obtained in the range 425° to 475° C. Difficulties are encountered below 400° C. and above 500° C., and these temperatures may be considered the satisfactory operating limits.

Atmospheric pressure is preferred, although elevated pressures are not objectionable and small pressure variations do not materially affect the yields or purity of the product.

The reaction is usually complete in less than five hours, the time depending to some extent on the crystalline form and particle size of the raw material, the temperature of the reaction, and the size of the charge. Ordinary commercial purity carbon tetrachloride is satisfactory for the reaction. The process may be carried out in glass or metal apparatus.

Inert gases other than nitrogen may be utilized but in the case of materials like illuminating gas some pyrolysis has been noted. The apparatus may be utilized for chlorinating other oxides but where the conditions of the reaction may produce a very volatile metal chloride as a reaction product, clogging of the exit lines is usually encountered.

Since uranium compounds are expensive and usually handled in small quantities it has appeared satisfactory to illustrate laboratory-size apparatus. With cheaper metals, which can be handled on a much larger scale, it is obvious that plant size or large scale metal apparatus would be used.

The present invention is particularly useful in the treatment of uranium trioxide since it provides a method for obtaining uranium tetrachloride instead of the pentachloride normally obtained.

After the uranium tetrachloride has been produced it may be poured from the chamber. It should be run into a dry container and maintained in storage under an environment of carbon dioxide or in vacuum.

The uranium tetrachloride produced in accordance with the present invention has a crystal size and structure especially suitable for sublimation or vaporization in vacuum apparatus. Its form allows it to be readily out-gassed and there is little tendency for it to be transported as a dust while being processed in a vacuum.

Probably many apparently widely different embodiments of this invention may be made without departing from the principle, breadth and spirit thereof and it is to be understood therefore that this invention is not limited to the specific embodiments thereof except as encompassed in the claims.

What is claimed is:

1. The process for producing uranium tetrachloride of high purity and of a crystal size and structure especially suitable for vaporization in vacuum apparatus comprising producing carbon tetrachloride vapor from a liquid source thereof in a vaporization zone disposed above and in free communication with a reaction zone, conducting said carbon tetrachloride vapor from said vaporization zone by gravity flow to contact and react with uranium trioxide disposed in said reaction zone at a temperature of 500° C. to convert the trioxide into uranium tetrachloride substantially in situ and whereby the effluent gaseous reaction products which contain unreacted carbon tetrachloride are displaced upwardly through said reaction and vaporization zones, condensing said unreacted carbon tetrachloride from the effluent gaseous reaction products, and returning the carbon tetrachloride to said liquid source of carbon tetrachloride to be recycled for reaction with the uranium trioxide.

2. In the process for producing uranium tetrachloride of high purity and of a crystal size and structure especially suitable for processing in vacuum apparatus comprising producing carbon tetrachloride vapor from a liquid source thereof in a vaporizing chamber which chamber is in free communication with a reaction chamber having a portion thereof disposed at a lower position than said vaporizing chamber, introducing said carbon tetrachloride vapor into said reaction chamber by gravity flow to react with an oxide of uranium disposed in said lower portion of the reaction chamber and maintained at a temperature in the range of 400° to 500° C. so as to produce uranium tetrachloride substantially in situ and gaseous reaction products which are displaced upwardly by said carbon tetrachloride vapor, and conducting said gaseous reaction products through said vaporizing chamber, whereby the carbon tetrachloride vapor flows gently and continuously in contact with the uranium oxide in said reaction chamber thereby preventing the transport of uranium materials therefrom.

3. The process as defined in claim 2, wherein said uranium oxide is a material selected from the group consisting of uranium dioxide and uranium trioxide.

4. The process as defined in claim 2 wherein said uranium oxide is uranium dioxide and said temperature range is 425° to 475° C.

5. The process as defined in claim 2 wherein said uranium oxide is uranium dioxide and said temperature is 450° C.

References Cited in the file of this patent

UNITED STATES PATENTS

| | | |
|---|---|---|
| 1,179,394 | Barton | Apr. 18, 1916 |
| 1,312,743 | Moeys | Aug. 12, 1919 |
| 1,468,961 | Cary-Curr | Sept. 25, 1923 |
| 1,646,734 | Marden | Oct. 25, 1927 |
| 2,006,513 | Rascher et al. | July 2, 1935 |
| 2,178,685 | Gage | Nov. 7, 1939 |
| 2,192,140 | McCreary | Feb. 27, 1940 |

OTHER REFERENCES

Mellor: "Comprehensive Treatise on Inorganic and Theoretical Chemistry," vol. XII, 1932, page 83.

Mellor: "Comprehensive Treatise on Inorganic and Theoretical Chemistry," vol. 12, 1932, page 80.

Colani: Annales de Chimie et de Physique, Ser. 8, vol. 12, pages 69–71 (1907).